United States Patent [19]

Meyer

[11] 4,012,312

[45] Mar. 15, 1977

[54] HYDROCARBON HYDROCRACKING PROCESS

[75] Inventor: Jarold A. Meyer, Concord, Calif.

[73] Assignee: Chevron Research Company, San Francisco, Calif.

[22] Filed: Dec. 22, 1975

[21] Appl. No.: 643,565

Related U.S. Application Data

[60] Division of Ser. No. 438,504, Jan. 31, 1974, Pat. No. 3,978,001, which is a continuation-in-part of Ser. No. 250,399, May 4, 1972, abandoned.

[52] U.S. Cl. .............................. 208/111; 252/438; 252/453; 252/455 R; 252/455 Z
[51] Int. Cl.$^2$ .................. B01J 37/02; B01J 27/24; C10G 13/06
[58] Field of Search ........... 208/112, 109, 110, 111

[56] References Cited

UNITED STATES PATENTS

| | | | |
|---|---|---|---|
| 3,617,509 | 11/1971 | Hensly | 208/111 |
| 3,801,515 | 4/1974 | Olson | 252/453 |

OTHER PUBLICATIONS

A. A. Noyes, "Qualitative Chemical Analysis," MacMillan (1927).
F. E. Beamish, "The Analytical Chemistry of the Noble Metals," Pergamon Press (1972).

*Primary Examiner*—Delbert E. Gantz
*Assistant Examiner*—G. E. Schmitkons
*Attorney, Agent, or Firm*—G. F. Magdeburger; R. H. Davies; D. L. Hagmann

[57] ABSTRACT

This invention is concerned with a hydrocarbon hydrocracking process using a catalyst prepared by:
 A. Forming an intimate mixture of a gelatinous silica-alumina precipitate and an organic-metal compound obtained by interaction of a transition series metal compound with an organic gravimetric reagent therefore; and
 B. Converting said mixture to said catalyst by at least a step of heating the mixture at a temperature in the range of 500° to 1800° F for a period in the range 1 to 48 hours, said catalyst being porous and having a surface area in the range 50 to 700 m$^2$/g.

10 Claims, No Drawings

HYDROCARBON HYDROCRACKING PROCESS

This application is a division of application Ser. No. 438,504 filed Jan. 31, 1974 now U.S. Pat. No. 3,978,001, which is a continuation-in-part of application Ser. No. 250,399, filed May 4, 1972 (abandoned) which is hereby referred to and incorporated herein by reference.

BACKGROUND OF THE INVENTION

1. Field

The present invention is concerned with catalysts, particularly those useful in hydroconversion processes, more preferably hydrocracking processes, a method of manufacturing the catalysts, and a process for using the catalysts.

2. Prior Art

The prior art abounds with methods for the production of catalysts comprising a metal associated with the surface of a porous inorganic oxide support. In accordance with the prior art, said catalyst can be produced, for example, by impregnating a preformed inorganic oxide carrier with the metal or by coprecipitating the metal as an oxide or hydroxide along with the materials forming the porous inorganic oxide support; for example, the pH of a solution containing dissolved silica, alumina and palladium can be adjusted to the point where the silica and alumina coprecipitate and the palladium is chemisorbed to a limited extent onto the resulting silica-alumina coprecipitate, said palladium being primarily in the form of soluble palladium hydroxide and/or soluble palladium salts. The palladium does not coprecipitate along with the silica and alumina since the palladium cation and, more particularly, palladium hydroxide, are soluble at pH's within the range that silica and alumina coprecipitate.

U.S. Pat. Nos. 1,280,314, 1,282,296 and 1,282,297 teach impregnating a powder with nickel by precipitation with a nitrogenous organic colloid.

U.S. Pat. No. 2,662,861 teaches preparing: (1) a slurry of alumina, washing it, adding a promoter, bubbling hydrogen sulfide through (2) a solution of chloroplatinic acid hexahydrate, mixing (1) and (2) together and drying to form a catalyst.

U.S. Pat. No. 2,898,305 teaches mixing silica in a slurry form with an insoluble inorganic compound, drying and calcining.

U.S. Pat. No. 2,688,603 teaches catalyst preparation by distributing an organic compound containing a potentially catalytically active metal on the surface of a suitable support and decomposing the precursor to remove the organic portion of the molecule.

U.S. Pat. No. 3,210,296 teaches impregnating an inorganic oxide support by use of a noble metal compound dissolved in an alcohol, ether, aldehyde, ketone or mixture thereof.

It has been surprisingly discovered that when catalysts comprising a metal associated with a porous inorganic oxide support are prepared by the method of the present invention, a larger proportion of the metal, preferably palladium, attempted to be incorporated into said catalysts is actually incorporated therein than is obtained by the prior art coprecipitation-plus-chemisorption method of catalyst preparation. It has also been surprisingly discovered that when a catalyst is prepared according to the present invention the resulting catalyst has higher catalytic hydrogenation stability than do prior art catalysts. It is believed that the higher catalytic hydrogenation stability found for the catalyst prepared in accordance with the present invention is the result of the attainment of a more uniform dispersion of the metal upon the surface of the porous inorganic oxide support than is obtained by the prior art methods of catalyst preparation.

SUMMARY OF THE INVENTION

In accordance with the present invention, a process is set out for preparing a catalyst comprising the steps:

A. forming in an aqueous medium a gelatinous precipitate and a finely divided organic-metal compound, the gelatinous precipitate comprising an inorganic oxide or precursor thereof and the organic-metal compound formed by reaction in the aqueous medium of a metal compound dissolved therein with an organic gravimetric precipitating agent, B. intimately intermixing the genatinous precipitate and the organic-metal compound within two hours of formation of the gelatinous precipitate, thereby forming a catalyst precursor, C. converting the precursor to a catalyst, the converting including at least a step of heating the precursor at 500°–1800° F for 1 to 48 hours.

In a particular embodiment, the catalyst is prepared by the steps comprising:

A. Forming a mixture comprising an aqueous gelatinous precipitate containing in intimate admixture a first component, the precipitate comprising an inorganic oxide or precursor thereof:

B. Forming a catalyst precursor comprising at least one organic-metal-compound precipitate and the gelatinous precipitate by reacting the first component with a second component, the reaction being effected by intimately intermixing said mixture with said second component, both components belonging to different groups, and being selected from the following groups:

a. a first group consisting of water soluble transition metal series compounds; and b. a second group consisting of water soluble organic gravimetric reagents for the transition series compounds:

C. converting the catalyst precursor to a catalyst, the converting comprising at least a step of maintaining catalyst precursor at a temperature in the range from about 500° to 1800° F for a period in the range from about 1 to 48 hours.

DETAILED DESCRIPTION OF THE INVENTION

The Porous Inorganic Oxide Support

The catalyst of the present invention can be prepared on any suitable inorganic oxide support. The porous inorganic oxide supports useful in the present invention include a large number of materials with which the transition metal can be included. The support can be a single inorganic oxide or combinations of inorganic oxides which form gels. Typical inorganic oxides that can be used are silica, alumina, magnesia, zirconia, titania, and combinations thereof, such as silica-alumina, silica-zirconia, silica-alumina-zirconia, silica-magnesia, silica-alumina-magnesia, or the like. The inorganic oxide supports for the purposes of the present invention must be porous, i.e., have a surface area of from 50 to 700 m$^2$/gm, and more preferably from 150 to 700 m$^2$/gm.

An amorphous silica-alumina support having an alumina content of 40 to 95 weight percent is the preferred support for the hydrocracking catalyst.

The Metal

Any suitable catalytically active metal can be used in the unique catalyst preparation process of the present invention. A suitable catalytic metal is a metal which will not substantially completely coprecipitate with the inorganic oxide(s) at the pH the precipitation of the inorganic oxide(s) occurs. The fact that the metal may chemisorb to some extent on the inorganic oxide gelatinous precipitate does not reduce the suitability of the metal for use in the present invention.

Suitable catalytically active metals include the transition metals (see Reference Book of Inorganic Chemistry, by W. M. Latimer and J. H. Hildebrand, Revised Edition, pps. 378 et seg, that is the three series of transition metals as follows: first series, metal of atomic numbers 22–30, inclusive; second series, metals of atomic numbers 40–48, inclusive; and third series, metals of atomic numbers 72–80, inclusive. The Group VIII transition metals are preferred, and more preferable are noble metals of the Group VIII transition metals, i.e., ruthenium, rhodium, palladium, osmium, iridium and platinum of which palladium is most preferred.

The process of the present invention is especially useful with metals that are desirably composited with the catalyst at a relatively small amount, for example in an amount in the range from about 0.01 to about 3 weight percent of the total composite, and more preferably in the range from about 0.02 to about 1.0 weight percent. When a metal is present in the catalyst in a relatively small amount, it is very desirable that the metal is finely divided and dispersed as uniformly as possible over the surface, both internal and external, of the support. This insures that a greater effective metal surface area will be present in the catalyst.

Preferably the catalytically active metal component used in the present invention is a metal component having hydrogenation-dehydrogenation activity. The most preferred hydrogenation-dehydrogenation metal components are the Group VIII noble metals, i.e., platinum, palladium, iridium, osmium, rhodium, and ruthenium, with the metal being present with composite in an amount from 0.01 to 3 weight percent, and more preferably from 0.02 to 1.0 weight percent.

Metals which promote the activity of the Group VIII noble metals for hydrogenation-dehydrogenation, such as, for example, rhenium, technetium, lead, tin and germanium, are also desirably present in an amount from 0.01 to 3 weight percent of the catalytic composite, and more preferably in the range from about 0.02 to about 1.0 weight percent. These promoters, in general, may also advantageously be incorporated in the catalyst by the method of the present invention. It is especially preferred to prepare a promoted palladium-containing catalyst by the method of the present invention.

When the term "metal" is used herein to describe the catalyst prepared by the method of the present invention, it is understood that the metal or metal component may exist in the final catalyst as the metal, as an inorganic compound thereof, or as a mixture of the metal and an inorganic compound or compounds thereof. Thus, the metal may exist as the oxide, chloride, sulfide, or the like.

The Organic Precipitant

Organic compounds, in general, suitable for use as gravimetric reagents for the subject metal compounds in aqueous media are suitable for use in the practice of the invention and are contemplated for such use. Suitable organic gravimetric reagents are, in general, organic compounds which have no carbon-metal linkages and have at least a moderate solubility in water. In their use, the organic compound reacts or interacts with the transition metal compound by one or more reaction mechanisms including complex-compound formation and metathesis and a water insoluble compound is formed. Representative reactions are as follows:

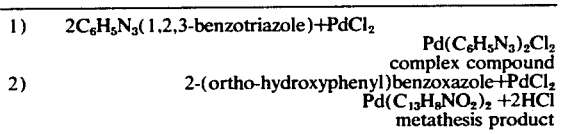

1) $2C_6H_5N_3(1,2,3\text{-benzotriazole}) + PdCl_2$
   $Pd(C_6H_5N_3)_2Cl_2$
   complex compound
2) $2\text{-(ortho-hydroxyphenyl)benzoxazole} + PdCl_2$
   $Pd(C_{13}H_8NO_2)_2 + 2HCl$
   metathesis product The precipitates produced by the reaction of an organic gravimetric reagent with a transition metal compound as herein are believed to involve in general bonding (polar and/or coordinate complex) between the metal cation and one or more non-metallic (such as oxygen, nitrogen and sulfur) electron-rich constituents of the organic compound. For convenience and by definition, these are referred to herein as organic-metal compounds.

Whether a gravimetric reagent is satisfactory depends upon the desired degree of precipitation of the metal constituent from the aqueous solution. In general, the reagent should be one for which the solubility product (Ksp, i.e., the product of (molar concentration of organic gravimetric compound in the aqueous solution) times the (molar concentration of the metal constituent in the aqueous solution)=Ksp; see Qualitative Chemical Analysis by A. A. Noyes, page 122) at the precipitation temperature is less than about $10^{-3}$, preferably less than $10^{-5}$ in the case of the costly metals, for example the Group VIII noble metals. In a corollary sense, the foregoing in general requires that a satisfactory organic gravimetric compound have a water solubility of at least about 0.01 molar (a moderate water solubility) and preferably a solubility of at least about 0.1 molar.

Representative organic gravimetric reagents suitable for use herein include 1,2,3-benzotriazole, nioxime, 1,10-phenanthroline, α-nitroso-β-naphthol, 2-hydroxy-1-naphthaldehyde, dimethylphenylbenzylammonium chloride, phenylsemicarbazide, phenothiazine, thiourea, 2-mercaptobenzothiazole, thiophenol, dimethylglyoxime, α-furil dioxime, thionalide, thioacetamide, β-mercaptopropenoic acid, 2,3-dimercapto-1-propanol, strychnine sulfate, acridine, 2-phenylbenzothiazole, thiobarbituric acid, 2-mercaptobenzoxazole, thioacetanilide, ammonium p-aminophenyldithiocarbamate, 1-nitroso-2-naphthol, salicylaldoxime, benzolymethylglyoxime, β-furfuraldoxime, α-benzoin oxime, oxalenediamidoxime, 2-thiophene-transaldoxime, 2-ortho-hydroxyphenylbenzoxazole, N-phenyl-N-phenylazo-hydroxylamine, 6-nitroquinoline, 5-methyl-8-hydroxyquinoline, guinaldinic acid, guinolinic acid, β-aminopicolinic acid, α-picolinic acid, piaselenol, 1,3-dimethyl-4-imino-5-hydroxyimino alloxan, α,β- bis(hydroximino)acetoacet-o-toluidide, 3-hydroxy-1-(p-tolyl)-3-phenyltriazine, p-thiocyanatoaniline, p-aminosalicylic acid, p-amino-acetophenone, phthalahilic acid, 1-naphthylphthalanilic acid, p-tolylphthalanilic acid, ortho-carboxyisonitroso-acetanilide, α,β-dioximidoacetoacetanilide, 2-mercaptobenzimidazole, phenylthiohydantoic acid, diethyldithiophosphoric acid, and the like organic gravimetric reagents (see The Analytical Chemistry of the Noble Metals, by F. E. Beamish, Pergamon Press). Of the particular classes of organic gravimetric reagents, the oximes, azoles, sulfides, and anilides, the azoles are preferred for use herein. Of the latter, the azoles which contain an aromatic ring, for example 1,2,3-benzotriazole and the like, and the inertly substituted derivatives thereof, are most preferred, particularly for use with Group VIII noble metals because of the efficient precipitation of these metals by them. By inert, having reference to substituents, is meant a substituent which does not cause reduction of the catalytic metal constituent of the transition metal compound to the metal. The precipitation of a transition metal compound in an aqueous medium by an organic gravimetric reagent is conventional, and it is to be understood that this practice per se is not the gist of the present invention.

The Gelatinous Precipitate

It is essential to the practice of the invention that the inorganic oxide gelatinous precipitate be freshly prepared. If the inorganic gelatinous precipitate is allowed to age for a time before the organic-metal compound is formed therein and is intimately intermixed therewith, an inferior catalyst will result. While not wishing to be bound to this explanation, it is believed that longer delays allow the gelatinous precipitate to further set up, forming "cross-links," which forstall uniform distribution of the precipitated metal compound in the gelatinous precipitate and ultimately on all the surfaces of the support.

Preferably the fresh inorganic oxide gelatinous precipitate is prepared substantially immediately preceding the precipitation of the organic-metal compound and the intimate intermixing of the precipitated organic-metal compound therewith. Thus, it is preferred that no more than 2 hours, and preferably no more than 1 hour, elapse after the formation of the inorganic oxide gelatinous precipitate before the intimate intermixing occurs.

The intimate intermixing is preferably accomplished as follows: an aqueous medium is formulated comprising: (1) dissolved precursors of the gelatinous precipitate; and (2) dissolved metal. The pH of the solution is adjusted by the addition of base or acid thereto until the gelatinous precipitate results. An organic precipitating agent is then added, for example benzotriazole or dimethylglyoxime, to the aqueous slurry of the freshly prepared inorganic oxide gelatinous precipitate while agitating the slurry to precipitate the dissolved metal as finely divided organic-metal compound. In large part, this precipitate is formed in situ in the aqueous gel (hydrogel) and the balance, if any, is substantially (at least about 95 percent efficient) incorporated into the gel by the intimate intermixing.

While it is preferred that the gelatinous precipitate be formed prior to precipitation of the organic-metal compound, the method of manufacturing a catalyst of the present invention can be carried out by first precipitating the organic-metal compound followed by precipitation of the inorganic oxide or precursor thereof. It may in this situation be desirable to stabilize the finely divided organic-metal compound to prevent agglomeration of the particles by use of suitable stabilizers such as casein, polyacrylic acid, and the like.

The term "intimately intermixing" is used to mean that the finely divided organic-metal compound is uniformly distributed on the surface of the fresh inorganic oxide gelatinous precipitate. Generally, it is quite desirable that agitation take place to more completely accomplish the intimate intermixing. The agitation may be continuous or intermittent.

Once the finely divided organic-metal compound has been intimately intermixed with the fresh inorganic oxide gelatinous precipitate, the resulting intermixed organic oxide-gelatinous precipitate may then be treated by conventional methods to form catalyst particles of a practical and useful size.

Generally the intermixed organic-metal compound-gelatinous precipitate is formulated into particles, as for example, by extruding or the like, and the particles are then heated to a temperature within the range from about 500° to about 1800° F for from about 1 hour to about 48 hours. The heating serves to decompose the organic residue. The heating will further serve to calcine and activate the catalytic composite. Preferably, for hydrocracking catalysts, the heating will take place at a temperature within the range from about 950° to about 1800° F for from about 2 hours to about 8 hours.

The product produced in accordance with the present invention will, after the heating step, preferably exhibit a parameter consisting of the product of the bulk density in grams per cc of the particles and the surface area in square meters per gram which falls within the range from about 100 m$^2$/cc to about 500 m$^2$/cc, and more preferably, especially when the catalyst is a hydrocracking catalyst, within the range from about 200 m$^2$/cc to about 500 m$^2$/cc.

Generally the process for preparing a catalyst of the present invention will result in the incorporation of at least about 95 percent of the metal that is intimately intermixed with the gelatinous precipitate slurry into the intermixed organic-metal compound-gelatinous precipitate.

The catalyst of the present invention is effective in converting a wide range of hydrocarbon feedstocks, including petroleum distillates, petroleum residua and various cycle stocks. Preferably the hydrocarbon feedstocks will boil within the range from about 400° to about 1050° F, more preferably from about 500° to about 950° F.

The catalyst of the present invention is useful in many hydrocarbon hydroconversion processes, including hydrogenation, dehydrogenation and reforming processes, but it is especially useful when used in a hydrocracking process.

When the process of the present invention is used to make a hydrocracking catalyst, the organic nitrogen content of the hydrocarbon feedstock being hydrocracked should be below about 0.05 weight percent, preferably below about 0.02 weight percent, and more preferably below about 10 ppm. The organic sulfur content of the feedstocks also should be below about 0.05 weight percent, preferably below about 0.02 weight percent, and more preferably below about 10 ppm. If desired, the hydrocarbon feedstock may be subjected to a conventional hydrofining pretreatment step prior to being converted in the presence of the catalyst of the present invention.

Hydrocracking process conditions may be conventional conditions, for example a temperature within the range from about 450° to about 859° F, a pressure within the range from about 500 psig to about 3500 psig, a liquid hourly space velocity within the range for about 0.5 to about 3.0, and a total hydrogen rate within the range from about 1000 SCF to about 20,000 SCF, preferably from about 2000 SCF to about 10,000 SCF of hydrogen per barrel of feedstock.

When the catalyst is contacted with the hydrogen used in a hydrocracking reaction, some reduction to metal of any metal oxides that are present will take place. This is not detrimental, and in fact is necessary to develop the catalytic hydrogenation activity of the catalyst, so long as the hydrogen does not contact the catalyst at a temperature appreciably higher than the reaction temperature at the start of the run, i.e., a temperature high enough to cause sintering of the metal on the catalyst with concurrent metal surface area reduction.

The invention will be better understood with reference to the illustrative examples which follow.

EXAMPLES

EXAMPLE 1 — PRIOR ART CATALYST

A silica-alumina cogel was made following the general procedure set forth below.

1130 grams of $AlCl_3 \cdot 6H_2O$ were dissolved in 5 liters of $H_2O$, and 125 ml glacial acetic acid were added to form a first solution. 450 grams of sodium silicate were dissolved in 2.5 liters of water to form a second solution. Said first and second solutions were combined to form a mixture, the pH of which was adjusted to 6.5 by the addition of 3 liters of a solution of 2 parts $H_2O$ and 1 part $NH_4OH$. The resulting mixture, in the form of a suspension, was heated to 150° F, the pH was readjusted to 6.5, and the mixture was filtered to produce a cogel paste filter cake. The filter cake was dried at 95° F to a solids content of 30%. The solids were washed four times in about 10 liters of 1% ammonium acetate solution at 150° F. The washed gel was contacted with a solution containing 0.66 grams palladium tetraammine dinitrate in 570 ml of water for about 1 hour. The solution was removed, and the cogel, in 10–16 mesh form, was dried and a portion was calcined in substantially dry air for 4 hours at 450° F, 8 hours at 1000° F, and 4 hours at 1400° F.

This catalyst was used to hydrocrack a feedstock having the characteristics set forth in Table I below.

TABLE I

| ASTM D-1160 boiling range, ° F | |
|---|---|
| Start | 553 |
| 5% | 589 |
| 10% | 595 |
| 30% | 617 |
| 50% | 646 |
| 70% | 684 |
| 90% | 732 |
| 95% | 763 |
| End | 859 |

| Other Characteristics | |
|---|---|
| Gravity, ° API | 39.9 |
| Aniline point, ° F | 192.7 |
| Sulfur, ppm | 1–2 |
| Nitrogen, ppm | 0.1 |
| Pour point, ° F | +55 |
| Paraffins + naphthenes, vol. % | 90 |

TABLE I-continued

| Aromatics, vol.% | 10 |
|---|---|

The feedstock was hydrocracked in a recycle run under these conditions:

| Total pressure, psig | 1200 |
|---|---|
| Liquid hourly space velocity, V/V/hr. | 4.0 |
| Conversion, liquid vol. % to 550° F | 60 |
| Recycle gas rate, SCF/bbl. of feed | 5600 |
| Boiling range of liquid product recycled | 550° F+ |

Catalyst inspections and test results are shown in Table II.

EXAMPLE 2 — A CATALYST OF THE PRESENT INVENTION

A catalyst in accordance with the present invention in which palladium is precipitated as an organic-metal compound was made as follows (all parts by weight unless otherwise specified):

Solution A was 483 parts water, 100 parts glacial acetic acid and 1295 parts of an aluminum chloride solution containing 4.9 weight percent aluminum. Solution B was 278 parts sodium silicate solution (containing 28.7 weight percent $SiO_2$) and 1000 parts water. Solution B was combined with Solution A slowly, with rapid stirring. A clear solution results.

The combined solution was titrated to a pH of 6.0 with a solution of 3 volumes water to one volume concentrated $NH_4OH$, forming a gelatinous precipitate.

A solution containing 0.441 parts palladium as dissolved $Pd(NO_3)_2$ and $(Pd(NH_3)_4)(NO_3)_2$ in about 8 parts water was added to the gel. The mixture was stirred rapidly for about 15 minutes to insure that the palladium was uniformly dispersed throughout the gel. Then added to the gel were about 83 parts water containing 1.49 parts of dissolved 1,2,3-benzotriazole. Addition of the dissolved palladium and the benzotriazole was completed within about 40 minutes after the completion of the gel precipitation step. The mixture was stirred rapidly for 15–20 minutes to insure that the benzotriazole was uniformly dispersed throughout the gel. The benzotriazole reacted with the palladium to form an insoluble inorganic-metal compound.

After 1–½ hours aging, the slurry was heated to 140° F, the pH adjusted to 6.4, and the slurry was filtered and partially dried to about 70% volatiles content. 17.6 parts of this cake were formed and exchanged 5 times for ½ hour at 150° F in about 55 parts of water containing 1 weight percent ammonium acetate and having a pH of 6.0. After the exchange, the catalyst was washed once in water and partially dried to a volatiles content of 32.5 weight percent. This material was calcined in substantially dry air for 3 ½ hours at 400° F, 5 hours at 950° F, and 2 hours at 1400° F to produce the finished catalyst.

The first filtrate contained 0.4–0.5 ppm palladium. About 3250 parts of filtrate were produced, which therefore contained about 0.6–0.75 grams of palladium. Thus, over 99.5% of the palladium added remained with the filter cake. Analysis of the final catalyst confirmed that essentially all the added palladium is in the finished catalyst.

This catalyst was tested using the same feed and test conditions as Example 1. Catalyst inspections and test results are shown in Table II.

The run length obtained with this catalyst was 50% greater than obtained with a comparable prior art catalyst. This was accomplished without sacrificing product selectivity. In addition, the hydrogenation component was added during the normal production of the silica-alumina component, thereby eliminating the need for the costly steps associated with impregnation of the hydrogenation component.

TABLE II

|  | Example No. | |
| --- | --- | --- |
|  | 1 | 2 |
| Palladium content (wt. %) | 0.24 | 0.24 |
| Bulk density, grams/cc | 0.86 | 0.89 |
| Surface area, m²/gram | 363 | 345 |
| Final calcination temp., °F | 1400 | 1400 |
| Run length (hours to 680° F) | 380 | 570 |
| C₅+ liquid vol. % | 105.6 | 105.4 |
| C₅+wt. % yield at 640–650° F hydrocracking temperature | 93.5 | 93.6 |
| 250–550° F liquid vol. % yield at 640–650° F hydrocracking temperature | 64.3 | 64.9 |

As in the above example, it is usually more desirable that the metal compound be intimately intermixed into the gelatinous precipitate followed by the introduction of the organic gravimetric reagent and the ensuing precipitation of the organic-metal compound. The order of the introduction of the reactants, the soluble metal compound and the organic gravimetric reagent may also be reversed. In this event, the gravimetric reagent is intimately admixed with the gel, is incorporated in substantial part therein; and then the water soluble transition metal is likewise incorporated into the gel. Again, the desired insoluble organic-metal compound; complex compound and/or insoluble metathesis product, is formed substantially in situ in the gelatinous precipitate and a useful catalyst precursor is produced. It will be clear in view of the foregoing that in general the instant method is an effective means for producing catalysts of transition metal compounds.

It is apparent that many widely different embodiments of this invention may be made without departing from the scope and spirit thereof; and, therefore, it is not intended to be limited except as indicated in the appended claims.

What is claimed is:

1. In a process comprising contacting a hydrocarbon feedstock and hydrogen with a hydrocracking catalyst under hydrocarbon hydrocracking conditions, the improvement comprising preparing said catalyst by:
   A. forming in an aqueous medium a gelatinous precipitate and a finely divided transition series organic-metal compound, said gelatinous precipitate comprising, on a water-free basis, from 40 to 95 weight percent alumina and 60 to 05 weight percent silica, and said organic-metal compound comprising a precipitate formed by reaction in the aqueous medium of a transition series metal compound dissolved therein with 1,2,3-benzotriazole;
   B. intimately intermixing the gelatinous precipitate and the organic-metal compound within 2 hours of formation of the gelatinous precipitate, thereby forming a catalyst precursor;
   C. converting said precursor to a catalyst, the converting including at least a step of heating the precursor at a temperature in the range 500°–1800° F for a period in the range 1 to 48 hours, said catalyst being porous and having a surface area in the range from 50 to 700 m²/g.

2. In a process comprising contacting a hydrocarbon feedstock and hydrogen with a hydrocracking catalyst under hydrocarbon hydrocracking conditions, the improvement comprising preparing said catalyst by:
   A. forming in an aqueous medium a gelatinous precipitate and a finely divided transition series organic-metal compound, said gelatinous precipitate comprising, on a water-free basis, from 40 to 95 weight percent alumina and 60 to 05 weight percent silica, and said organic-metal compound comprising a precipitate formed by reaction in the aqueous medium of a transition series metal compound dissolved therein with an organic gravimetric precipitating agent for said compound;
   B. intimately intermixing the gelatinous precipitate and the organic-metal compound within two hours of formation of the gelatinous precipitate, thereby forming a catalyst precursor;
   C. converting said precursor to a catalyst, the converting including at least a step of heating the precursor at 500°–1800° F for 1 to 48 hours, said catalyst being porous and having a surface area in the range from 50 to 700 m²/g.

3. In a process comprising contacting a hydrocarbon feedstock and hydrogen with a hydrocracking catalyst under hydrocarbon hydrocracking conditions, the improvement comprising preparing said catalyst by:
   A. forming a mixture comprising an aqueous gelatinous silica-alumina precipitate containing in intimate admixture a first component; said precipitate comprising, on a water-free basis, from 40 to 95 weight percent alumina and 60 to 05 weight percent silica;
   B. forming a catalyst precursor comprising at least one transition series organic-metal compound precipitate and said gelatinous precipitate by reacting said first component with a second component, said reaction being effected by intimately intermixing said mixture with said second component, said components belonging to different groups, and being selected from the following groups:
      a. the group consisting of water-soluble transition metal series compounds; and
      b. the group consisting of water-soluble organic gravimetric reagents for said transition series compound;
   c. converting said catalyst precursor to a catalyst, said converting comprising at least a step of maintaining said catalyst precursor at a temperature in the range from about 500° F to 1800° F for a period in the range from about 1 to 48 hours, said catalyst being porous and having a surface area in the range from 50 to 700 m²/g.

4. The process as in claim 3 wherein the solubility product, Ksp, for the gravimetric reagent and metal constituent of said metal compound is less than about $10^{-3}$.

5. The process as in claim 4 wherein said Ksp is less than about $10^{-5}$.

6. The process as in claim 3 wherein said metal compound is a Group VIII metal compound.

7. The process as in claim 6 wherein said compound is a noble metal compound.

8. The process as in claim 7 wherein said compound is a palladium compound.

9. The process as in claim 3 wherein said organic gravimetric reagent is an azole.

10. The process as in claim 9 wherein said reagent is selected from the group consisting azoles containing aromatic rings and the inertly substituted derivatives thereof.

* * * * *